United States Patent [19]
Atkinson et al.

[11] 3,925,956
[45] Dec. 16, 1975

[54] FATIGUE RESISTANT SPLICE

[75] Inventors: Lester M. Atkinson, Marietta;
Carroll R. Bigham, Dunwoody;
James L. Peed, Marietta, all of Ga.

[73] Assignee: The United States of America as prepresented by the Secretary of the Air Force, Washington, D.C.

[22] Filed: July 22, 1974

[21] Appl. No.: 490,600

[52] U.S. Cl. ............ 52/758 D; 52/584; 52/467
[51] Int. Cl.² ............................................ F16B 5/06
[58] Field of Search .......... 52/758 C, 758 D, 758 R, 52/471, 584, 469, 471, 463, 467, 493

[56] References Cited
UNITED STATES PATENTS

| | | | |
|---|---|---|---|
| 2,813,310 | 11/1957 | Harrison | 52/584 X |
| 3,398,496 | 8/1968 | Mischke | 52/467 X |

FOREIGN PATENTS OR APPLICATIONS

| | | | |
|---|---|---|---|
| 911,228 | 3/1946 | France | 52/467 |

*Primary Examiner*—Werner H. Schroeder
*Assistant Examiner*—Wayne L. Shedd
*Attorney, Agent, or Firm*—Joseph E. Rusz; Jacob N. Erlich

[57] ABSTRACT

A method and apparatus for joining a pair of wing panels or the like by chordwise and spanwise splices. The splice is made up of a pair of splice plates, each engagingly mating with a pair of members which are either in abutting relationship with each other or have an insert located between adjacent ends thereof. Any suitable mechanical fastener as well as a bonding means fixedly secure the splice plates together thereby forming an extremely strong and reliable means of securely attaching a pair of members together.

2 Claims, 4 Drawing Figures

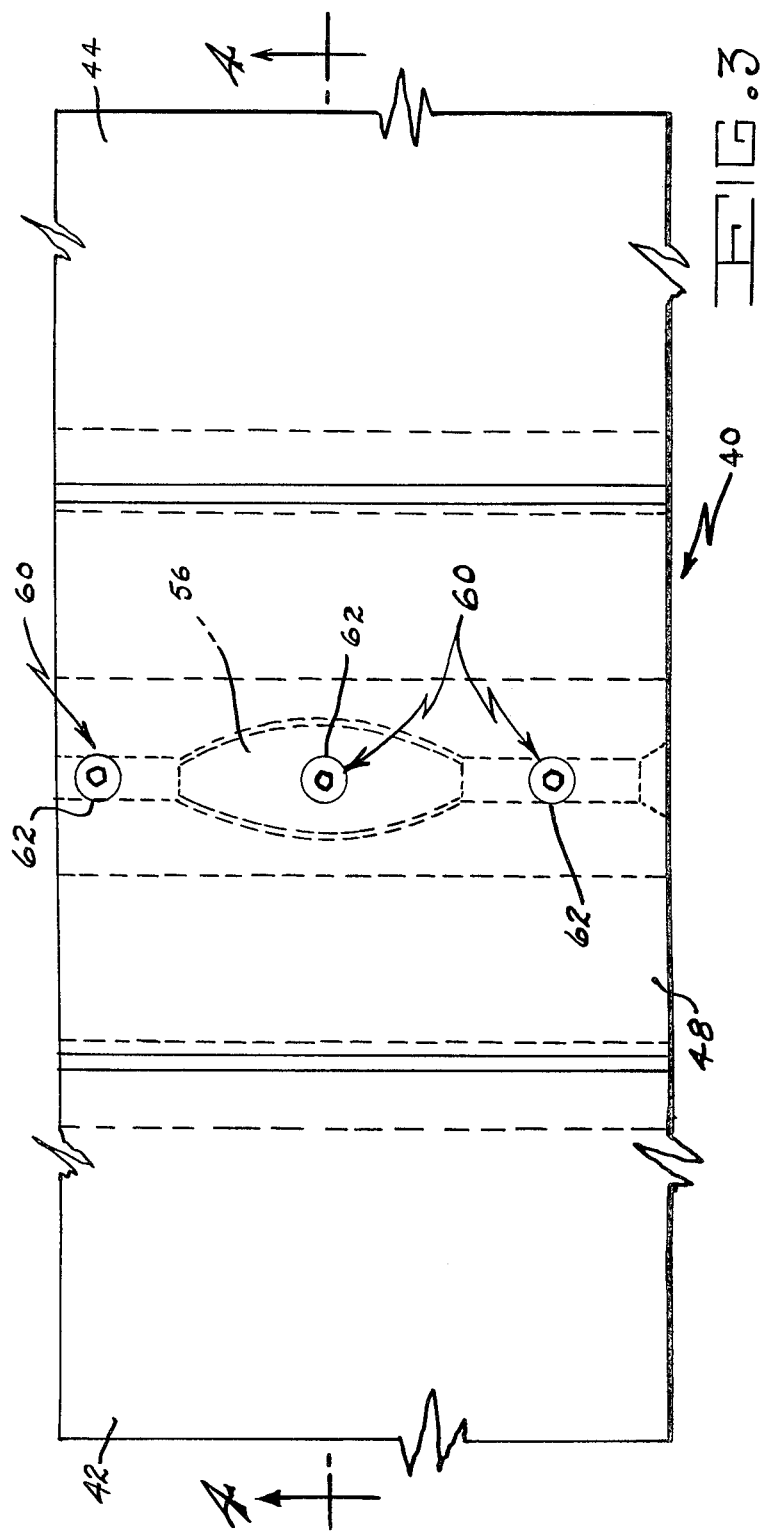
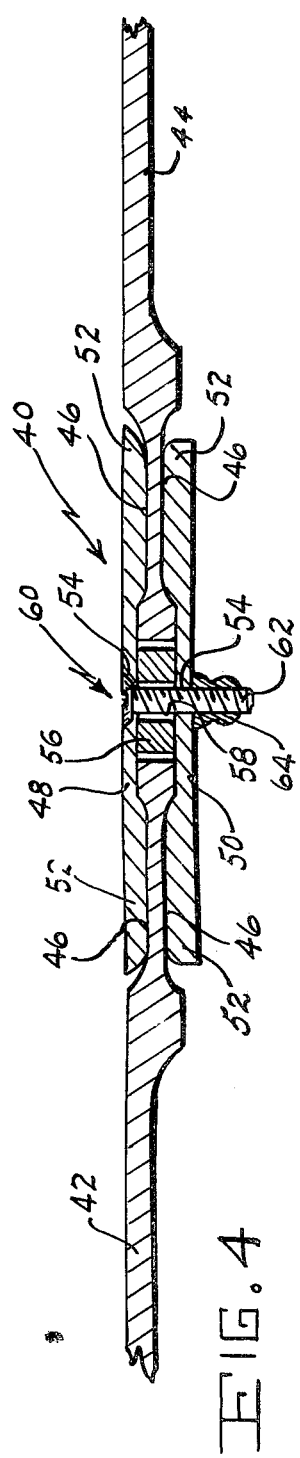

FATIGUE RESISTANT SPLICE

BACKGROUND OF THE INVENTION

This invention relates generally to splices for wing cover panels, and, more particularly, to a method and apparatus for producing fatigue resistant, fail safe splices.

In an aircraft, the wing structure is made up of the combination of outside fairing panels that provide the aerodynamic lifting surfaces and the inside supporting members that transmit the lifting force to the fuselage. The structure of a wing is an integration of the environment external to the vehicle wing, the aerodynamic shape of the wing, and the proposed use of the vehicle. The interaction of these three aspects of design leads to the selection of material, to the general structural layout, and, finally, to the detail choice of structural shapes, material thickness, joints and attachments. The result is a structural framework covered with a metal skin that also contributes to the load-carrying function.

Wing structure has evolved from the early use of wood, doped canvas and wire. The first general change was the replacement of wood with metal frameworks: wood and canvas structure is still found, however, in lightweight personal aircraft. Doped canvas was replaced by light metal skins, which served only as fairing in the beginning but which were later designed to provide a portion of the structural strength. Today, aluminum alloy outer skins are prime structural elements on all commercial transports and on the great majority of military craft.

An airframe wing is essentially two cantilever beams joined together. Each wing tip is the free end of the cantilever, and the center line of the vehicle represents the plane where the two fixed ends of the cantilevers are joined. The prime load-carrying portion of these cantilevers is a box beam made up usually of two or more vertical webs, plus a major portion of the upper and lower skins of the wing, which serve as chords of the beam. This box section also provides torsional strength and rigidity. Normally the prime box is designed to carry all the primary structural loads: these include all beam shears and bending moments, all drag shears and bending moments, and the torsional or twisting loads.

Leading and trailing edge portions of the wing forward and aft of the prime box respectively, help to provide the airfoil shape required. These portions are designed to minimize their participation in the major load-carrying function. Where participation is forced by the detail design, the fasteners and materials reflect this, but normally the prime box strength is not reduced.

Conventionally, it is a practice to form joints in the wing skin by riveting two adjacent plates to an underlying splice plate or strap. In such a joint the load carried by one piece of skin is transmitted through a first set of rivets to the splice plate, through the splice plate to the second set of rivets, and thence into the second piece of skin. Such a joint, if designed to safely carry the compressive loads, may be greatly overstrength as regards the lesser tensile loads, and thus inefficient from a weight and cost standpoint.

Another limiting factor in the use of mechanical fasteners for joining of wing cover panels is the penetration of cover material with fastener holes. Such a procedure causes stress concentrations within the material which must be accounted for in the design by a reduction of allowable operating stress. In addition, it is a costly joining method. Obviously, if these stress concentrations could be eliminated or significantly reduced while at the same time reducing cost by reducing the number of fasteners, the potential for fatigue, weight and cost improvements would be greatly enhanced.

SUMMARY OF THE INVENTION

The instant invention provides fatigue resistant spanwise and chordwise splices which overcome the problems set forth hereinabove by transferring longitudinal and transverse loads without the use of load-bearing holes in the basic wing structure.

In the chordwise splice, the wing panels or members are held in an abutting relationship, having a plurality of apertures therein located along the line of contact between members. The abutting relationship adds strength to the splice while the apertures within the members are unstressed under load. The abutting edges or ends of the panels are of a thickness greater than the width of the panels themselves and are joined with a pair of structural splices one on each side thereof. These splices are bonded to the panels and in addition have a mechanical fastener through the splice plates as well as through the apertures within the abutting edges.

The spanwise splice utilizes structural inserts located between adjacent panel members to be joined. In addition, the panels themselves are machined so as to form a pair of opposed indentations on each panel which accept the outstanding elements on a pair of splice plates. The splice plates in addition to being bonded to the panel members also rely upon at least one mechanical fastener inserted through the splices as well as through an aperture within the insert. This combination of securing means provides for a fail safe fatigue-resistant splice.

It is therefore an object of this invention to provide a splice which produces a fail safe mechanical joint in the event of bond failure.

It is another object of this invention to provide a splice which eliminates load-bearing holes within the splice members, and therefore insures long fatigue life of the splice.

It is still another object of this invention to provide a splice which is economical to produce, extremely durable, and which utilizes conventional, currently available components that lend themselves to standard mass producing manufacturing techniques.

For a better understanding of the present invention together with other and further objects thereof reference is made to the following description taken in conjunction with the accompanying drawing and its scope will be pointed out in the appended claims.

DESCRIPTION OF THE DRAWING

FIG. 3 is a plan view showing the spanwise splice of this invention securely joining a pair of members; and FIG. 4 is a side elevational view shown partly in cross section of the spanwise splice of this invention securely joining a pair of members.

DETAILED DESCRIPTION OF THE PREFERRED EMBODIMENTS

Figure 1:
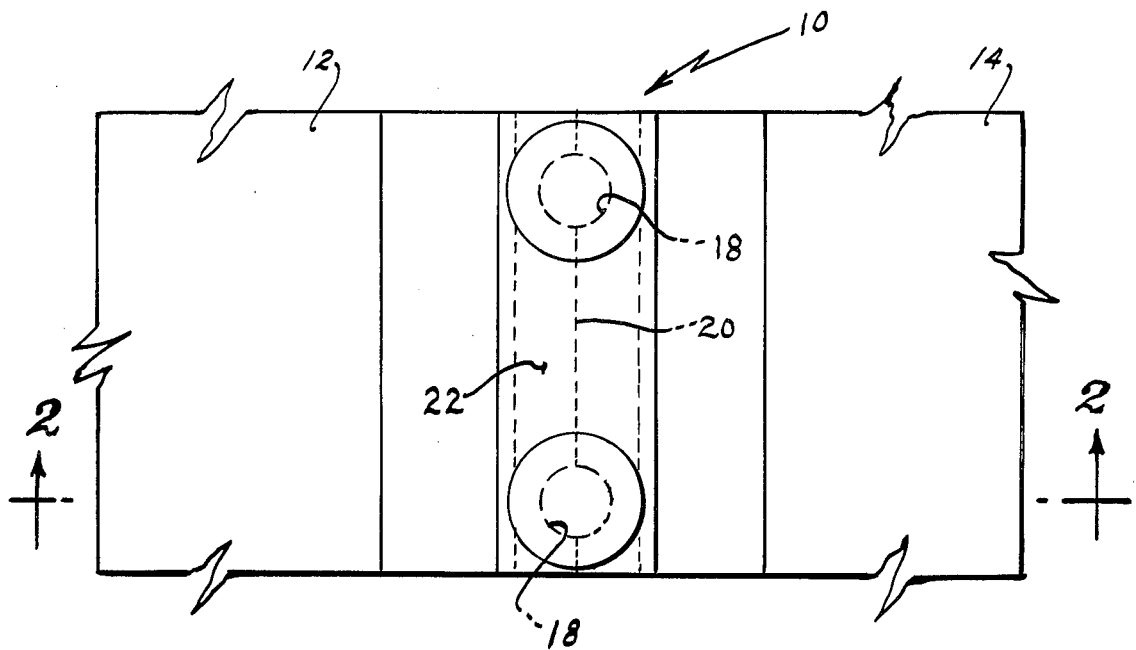
FIG. 1 is a plan view showing the chordwise splice of this invention securely joining a pair of members.
Figure 2:
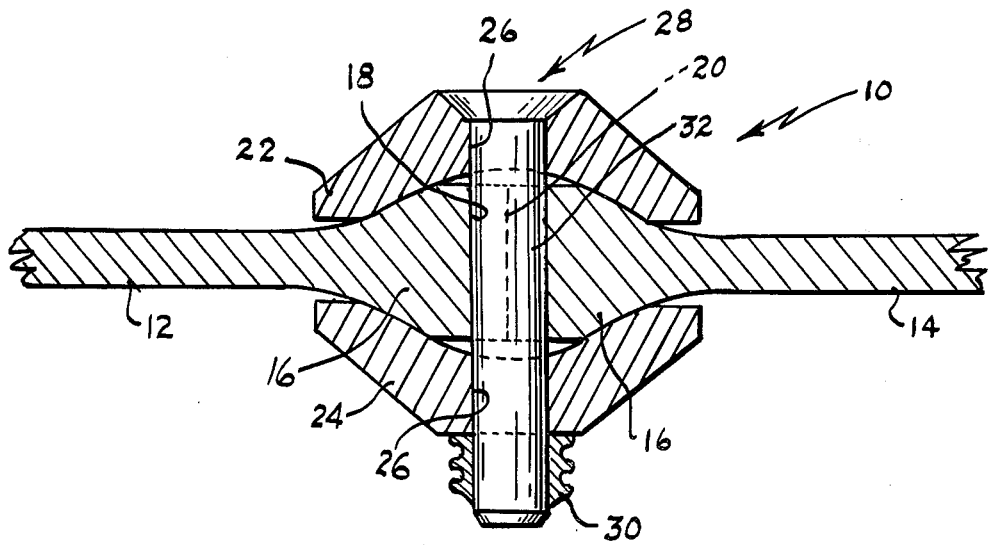
FIG. 2 is a side elevational view shown partly in cross section, of the chordwise splice of this invention securely joining a pair of members.

Reference is now made to FIGS. 1 and 2 of the drawing which best show the chordwise splice 10 which makes up the instant invention. Splice 10 finds its main utility in the joining together of the outer skin or panels 12 and 14 of a wing structure. It should be noted, however, that splice 10 may also be used in any environment in which the securing of a pair of members such as panels 12 or 14 is desirable.

When it becomes necessary to secure a pair of members such as panels 12 and 14 together, it is first required to machine one end of each panel into an enlarged segment 16, as best shown in FIG. 2 of the drawing. The end segments 16 are approximately twice the width of the remaining portion of panels 12 and 14. Before the splicing operation takes place end segments 16 are placed in abutting relationship and a plurality of apertures 18 drilled therein along the line of contact 20. In such an arrangement half the aperture 18 will be located in panel 12 with the remaining half in panel 14.

A pair of splice plates 22 and 24 are utilized in this invention in order to fixedly secure the two panels or members 12 and 14 together. Splice plates 22 and 24 are of substantially identical construction, being formed in a U-shaped configuration so as to overlie and matingly engage with the enlarged end segment 16 of members 12 and 14. A plurality of holes 26 are formed at a predetermined location within plates 22 and 24. The material which makes up splice plates 22 and 24 is preferably of high strength, such as steel or titanium, with the main requirement of the material being that the strength thereof is greater than the strength of the material which makes up panels 12 and 14.

When panels 12 and 14 are placed in abutting relationship with respect to one another and splice plates 22 and 24 matingly engaging end segments 16 thereof, holes 26 within splice plates 22 and 24 respectively are aligned with respective apertures 18. Any suitable fastener 28 having a nut 30 and bolt 32 securely holds splice plates 22 and 24 securely in position. For additional strength, splice plates 22 and 24 may be bonded by any suitable securing means such as welding or adhesives to the outstanding segments 16 of panels 12 and 14.

Since apertures 18 within panels 12 and 14 are unloaded and have no stress thereon and since the remaining portions of panels 12 and 14 are in abutting relationship, splice 10 of this invention is extremely rigid and has an increased fatigue life.

Reference is now made to FIGS. 3 and 4 of the drawing which show the spanwise splice 40 making up this invention. As with splice 10, although the main utility of this splice is in the joining together of the outer skin or panels 42 and 44 of a wing structure, it should be noted that splice 40 may also be used in any environment in which the securing of a pair of members such as panels 42 and 44 is desirable. Panels 42 and 44 have formed therein by any suitable means at one end thereof opposed indentations 46. These indentations matingly engage with a pair of opposed splice plates 48 and 50 in a manner to be described in detail hereinbelow.

Splice plates 48 and 50 are of substantially identical construction each having outstanding elements 52 at both ends thereof for engaging identations 46 on respective panels 42 and 44. In addition at predetermined locations therein a plurality of holes 54 are formed within splice plates 48 and 50. The material which makes up plates 48 and 50 is preferably of high strength with the main requirement being that the strength is greater than the strength of the material making up panels 42 and 44.

When the splicing operation is to take place, panels 42 and 44 are aligned with each other in such a manner that an insert element 46 or a plurality of such elements can be located between adjacent ends of panels 42 and 44. This insert is preferably of an aluminum alloy having at least one aperture 58 centrally located therein.

When splice plates 48 and 50 matingly engage with indentations 46 within respective panels 42 and 44, respective holes 54 are aligned with apertures 58 within insert 56. Any suitable fastener 60 having nut 62 and bolt 64 securely holds splice plates 48 and 50 in position. For additional strength of splice 40, the outstanding elements 52 of splice plates 48 and 50 may be bonded by any suitable securing means within indentations 46 of panels 42 and 44 respectively. By means of splice 40 of this invention, a rigid, increased fatigue-life splice is formed by the combination of a rigid insert 56, a pair of splice plates 48 and 50, and the elimination of load bearing holes in the panel structure.

Although this invention has been described with reference to particular embodiments, it will be understood to those skilled in the art that this invention is also capable of a variety of alernate embodiments within the spirit and scope of the appended claims.

We claim:

1. In a splice for fastening in fixed relationship with respect to one another a pair of aircraft wing panels which undergo both forces of compression and tension, the improvement therein comprising a pair of edge-abutting wing panels, an edge of each of said panels being transversely enlarged, each of said enlarged edges gradually increasing in size toward said edge over a longitudinal distance of more than twice the thickness of said wing panel and terminating at a thickness of substantially twice the thickness of the remainder of said panel whereby the stress concentrations produced thereon are both evenly and gradually distributed in the panel, said enlarged edge of each of said panels being in direct contact with one another, at least one semi-circular cut out located within said enlarged edge of each of said panels thereby forming at least one complete aperture along the area of contact of said edges of said panels, a pair of securing elements matingly engaging and mounted about said enlarged edges of said panels, the mating surface of each of said securing elements being a distance from said edges in excess of the thickness of said remainder of each of said wing panels, at least one hole located within each of said securing elements in alignment with said aperture in said edges of said panels, and means passing through said aperture in said wing panels and said hole in said securing means fixedly securing said panels together.

2. In a splice as defined in claim 1 further comprising means for bonding said securing elements about said enlarged edges of said wing panels.

* * * * *